(12) United States Patent
Davidson et al.

(10) Patent No.: US 9,178,241 B2
(45) Date of Patent: Nov. 3, 2015

(54) HIGH ALTITUDE PLATFORM

(75) Inventors: Peter Davidson, Onchan (IM); Hugh Edmund Murray Hunt, Cambridge (GB); Christopher John Burgoyne, Cambridge (GB)

(73) Assignee: Davidson Technology Limited, Onchan (IM)

( * ) Notice: Subject to any disclaimer, the term of this patent is extended or adjusted under 35 U.S.C. 154(b) by 232 days.

(21) Appl. No.: 13/810,615

(22) PCT Filed: Jun. 14, 2011

(86) PCT No.: PCT/GB2011/051109
§ 371 (c)(1),
(2), (4) Date: Jan. 16, 2013

(87) PCT Pub. No.: WO2012/013950
PCT Pub. Date: Feb. 2, 2012

(65) Prior Publication Data

US 2013/0115544 A1 May 9, 2013
US 2013/0344417 A9 Dec. 26, 2013

(30) Foreign Application Priority Data

Jul. 30, 2010 (GB) .................................. 1012864.3
Sep. 21, 2010 (GB) .................................. 1015807.9
Oct. 20, 2010 (GB) .................................. 1017685.7

(51) Int. Cl.
*H01M 8/22* (2006.01)
*B64B 1/50* (2006.01)
(Continued)

(52) U.S. Cl.
CPC . *H01M 8/22* (2013.01); *B64B 1/50* (2013.01); *B64C 39/022* (2013.01); *D07B 1/14* (2013.01); *H02K 7/1807* (2013.01); *D07B 5/005* (2013.01)

(58) Field of Classification Search
CPC .......... B64C 3/00; B63B 21/663; B64B 1/50; B64G 5/00
USPC ............ 244/158.1, 34 R, 2–24, 900; 429/505
See application file for complete search history.

(56) References Cited

U.S. PATENT DOCUMENTS 3,227,398 A 1/1966 Struble, Jr.
3,381,922 A * 5/1968 Laing .............................. 244/136
(Continued)

FOREIGN PATENT DOCUMENTS

CN 201436234 U 4/2010
DE 2314714 * 3/1974 .............. B64C 27/04
(Continued)

OTHER PUBLICATIONS

Ellenberger, J. Phillip. (2010). Piping and Pipeline Calculations Manual—Construction, Design, Fabrication, and Examination. (pp. 53-54). Elsevier.*

(Continued)

*Primary Examiner* — Miriam Stagg
*Assistant Examiner* — Haroon S Sheikh
(74) *Attorney, Agent, or Firm* — DASCENZO Intellectual Property Law, P.C.

(57) ABSTRACT

An apparatus for generating electrical energy at altitude, comprising a tether connecting a substantially ground level location, part to a platform at an elevated location, the tether comprising a conduit coupled to an electrical generator at the platform, the conduit arranged to allow the flow of a fuel fluid from the substantially ground level location to the elevated location, and the electrical generator being operable to convert energy in the fuel fluid to electrical energy at the elevated location.

20 Claims, 12 Drawing Sheets

(51) Int. Cl.
*B64C 39/02* (2006.01)
*D07B 1/14* (2006.01)
*H02K 7/18* (2006.01)
*D07B 5/00* (2006.01)

(56) References Cited

U.S. PATENT DOCUMENTS

| | | | |
|---|---|---|---|
| 3,834,655 A * | 9/1974 | Crosby, Jr. | 244/135 R |
| 4,999,640 A | 3/1991 | Wheeler | |
| 6,325,330 B1 | 12/2001 | Lavan, Jr. | |
| 6,422,506 B1 | 7/2002 | Colby | |
| 7,046,934 B2 | 5/2006 | Badesha et al. | |
| 2002/0167702 A1 | 11/2002 | Badesha et al. | |
| 2005/0000802 A1* | 1/2005 | Hobbs | 204/277 |
| 2007/0176432 A1* | 8/2007 | Rolt | 290/55 |
| 2008/0074897 A1 | 3/2008 | Kemp et al. | |
| 2008/0265086 A1 | 10/2008 | Lee | |
| 2009/0289148 A1* | 11/2009 | Griffith et al. | 244/155 R |
| 2010/0101833 A1 | 4/2010 | Zachariades et al. | |

FOREIGN PATENT DOCUMENTS

| | | |
|---|---|---|
| DE | 2314714 | 10/1974 |
| EP | 2228301 A2 | 9/2010 |
| FR | 2886491 | 12/2006 |
| FR | 2908381 | 5/2008 |
| GB | 1191322 | 5/1970 |
| WO | WO 01/52453 A1 | 7/2001 |

OTHER PUBLICATIONS

Pipitone, Emiliano and Genchi, Giuseppe. Experimental Determination of Liquefied Petroleum Gas—Gasoline Mixtures Knock Resistance J. Eng. Gas Turbines Power 136, 121502 (2014) (pp. 3).*
English-language translation of German Patent No. 2314714.
English-language translation of French Patent No. 2886491.
English-language abstract of French Patent No. 2908381, European Patent Office, May 16, 2008.
English-language abstract of Chinese Patent No. 201436234 U, European Patent Office, Apr. 7, 2010.
"Tethered Aerostat Radar System," date and author unknown but relates to period 1980-1999, located in the following webpage dated Feb. 24, 2000: http://www.fas.org/nuke/guide/usa/airdef/tars.htm.
Search Report issued in connection with United Kingdom Patent Application No. GB1012864.3, 2 pages, United Kingdom Intellectual Property Office, Nov. 25, 2010.
Search Report issued in connection with United Kingdom Patent Application No. GB1202044.2, 1 page, United Kingdom Intellectual Property Office, Apr. 30, 2012.
Search Report issued in connection with United Kingdom Patent Application No. GB1202048.3, 1 page, United Kingdom Intellectual Property Office, Apr. 30, 2012.
Search Report issued in connection with United Kingdom Patent Application No. GB1202072.3, 1 page, United Kingdom Intellectual Property Office, Apr. 30, 2012.
International Search Report and Written Opinion, PCT Patent Application No. PCT/GB2011/051109, 18 pages, European Patent Office, Feb. 16, 2012.

* cited by examiner

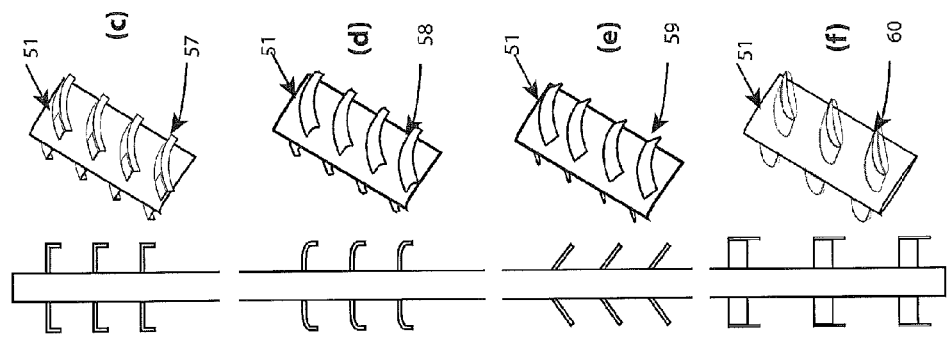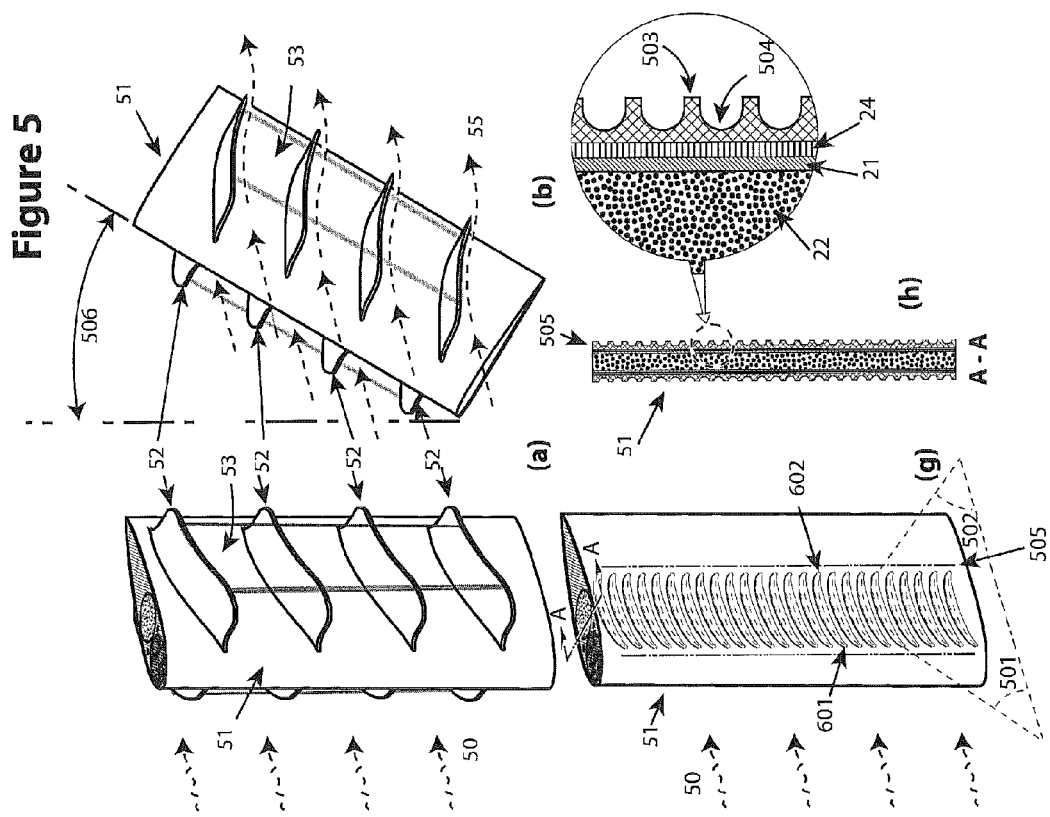
Figure 5

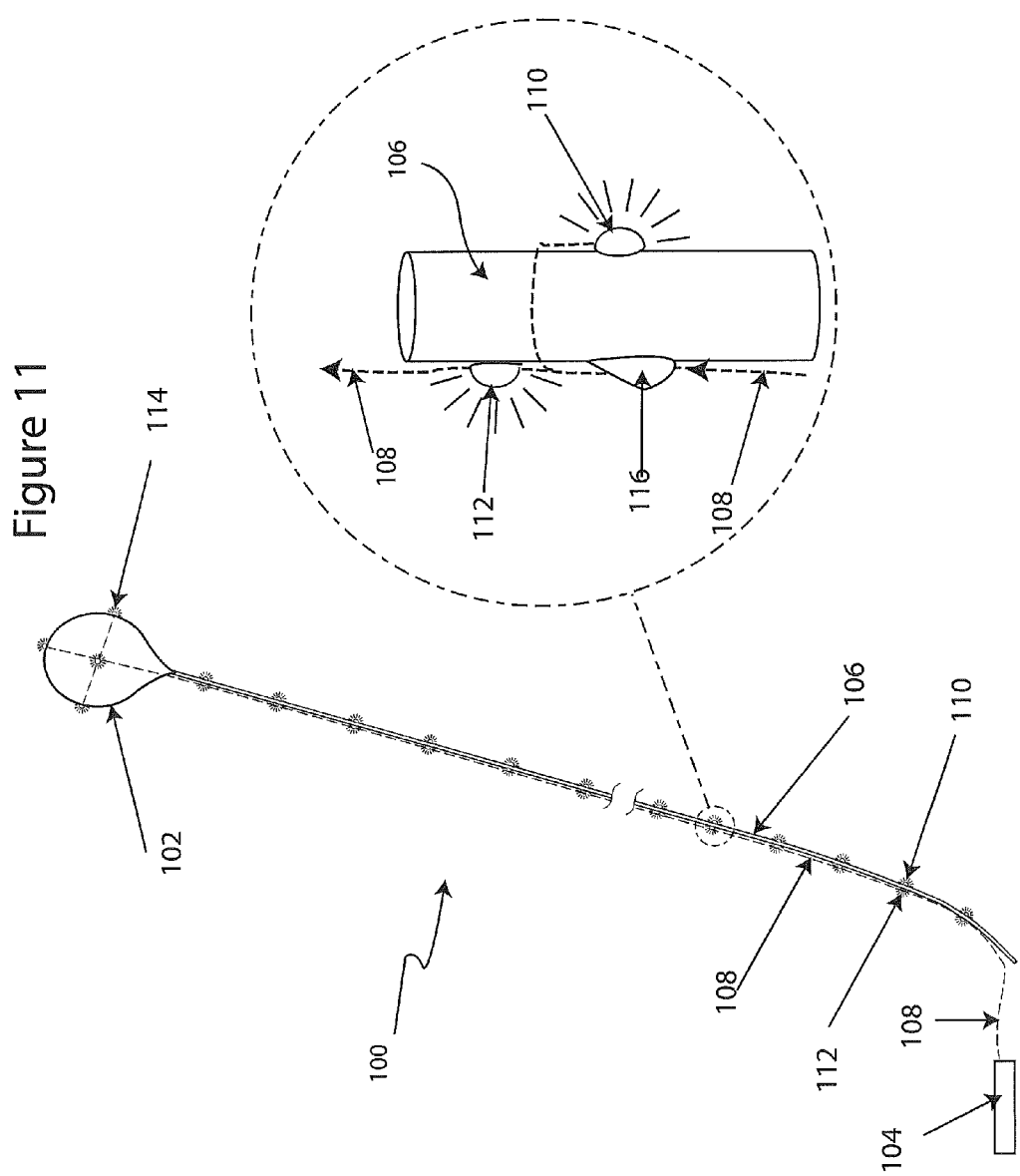

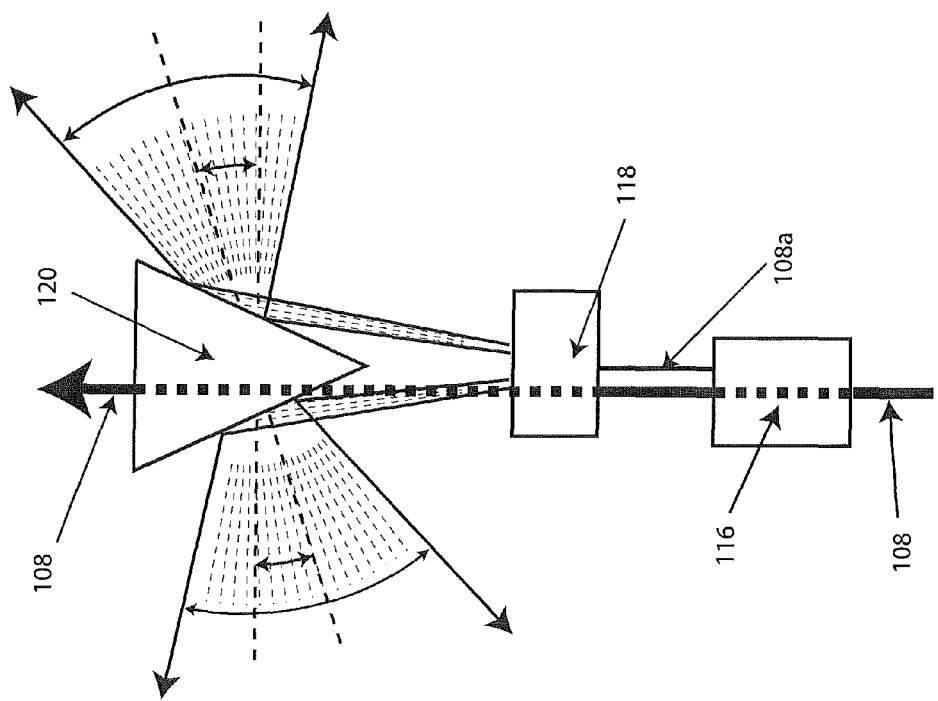

HIGH ALTITUDE PLATFORM

TECHNICAL FIELD

The invention relates to high altitude platforms, particularly for delivering information services at altitude, including telecommunications, observation and positioning services.

BACKGROUND TO THE INVENTION

High altitude platforms e.g. situated from 300 m to less than 5 km and even higher, e.g. situated from 5 to 30 km altitude, have been proposed for a wide variety of applications. One area of growing interest is in providing from high altitude platforms information services such as telecommunications, positioning and observation capabilities including high speed internet, e-mail, telephony, televisual services, backhaul services, video-on-demand, global positioning, astronomical observations, atmospheric monitoring for example by LIDAR (light detection and ranging) and aerial photography.

Compared with satellites, high altitude platforms have several advantages, primarily because the distance from a transmitter to a receiver on Earth can be much less, with geostationary satellites typically at 36,000 km altitude and for a low Earth orbit satellite around 1000 km altitude.

This relative nearness of high altitude platforms can result in much stronger signals being received at Earth and near the Earth's surface, avoid the expense of rocket launches and can provide shorter development times.

U.S. Pat. No. 7,046,934 discloses a high altitude balloon for delivering information services in conjunction with a satellite.

However, there are numerous and significant technical challenges to providing reliable information service from a high altitude platform. A key problem is maintaining the stability of such a platform, which will be subject to winds which can be turbulent and of very high speeds. In particular, many information services require accurate directional transmissions which are difficult to deliver from a platform subject to the high winds present at such altitudes.

Furthermore the power available locally at altitude is generally restricted to a few kW, ruling out engineering solutions involving high powered devices.

Therefore, further improvements in these areas would be highly desirable.

SUMMARY OF THE INVENTION

In a first aspect, the invention relates to an apparatus for generating electrical energy at altitude, comprising a tether connecting a substantially ground level location to a platform at an elevated location, the tether comprising a conduit coupled to an electrical generator at the platform, the conduit arranged to allow the flow of a fuel fluid from the substantially ground level location to the elevated location, and the electrical generator being operable to convert energy in the fuel fluid to electrical energy at the elevated location.

It has been found that providing a high altitude platform which can generate electrical power from a fuel fluid can allow for orders of magnitude more power available than that available from in situ generation such as solar generators which suffer from the need for electrical storage overnight and seasonal day length away from the equator.

With large quantities of power available at altitude, options for solving a variety of technical hurdles related to such platforms become available, which were not previously possible.

The engineering challenges involved in such an arrangement are significant. However, with careful design of the apparatus it can be achieved, as will be discussed below.

For many applications, the elevated location will be at an altitude of from 5,000 m to 30,000 m, preferably from 10,000 m to 25,000 m, more preferably from 15,000 m to 25,000 m. This provides sufficient altitude to deliver information services over a wide area whilst not being so high as to present insurmountable engineering challenges for the tethered arrangements. In a preferred embodiment, the elevated location is in the stratosphere, preferably just above or at the tropopause, where side winds are much less severe. Additionally, the elevated location may be at an altitude of from 300 m to less than 5,000 m for applications in the troposphere.

The substantially ground-level location is typically at or very near to the land or sea surface of Earth, e.g. within 1000 m, preferably within 100 m altitude of a land or sea surface. In one preferred embodiment, the apparatus comprises a vehicle, such as a helicopter, a land vehicle or a ship to which is coupled the tether.

In a preferred embodiment the apparatus comprises one or more balloons or dirigibles (lighter than air aircraft) at the elevated location, to provide the lift necessary to keep the apparatus at the elevated location. Such a one or more balloon or dirigible is therefore preferably capable of providing a lifting force of from 0.05 to less than 5.0 metric tonnes, more preferably at least 5.0 metric tonnes, most preferably at least 10.0 metric tonnes, and possibly at least 25 metric tonnes.

In order to provide such lift, any balloons or dirigibles preferably have a total volume of from 400 $m^3$ to less than 60,000 $m^3$ or from 60,000 $m^3$ to 2,000,000 $m^3$. Such lift is generally achieved by filling the balloon or dirigible with a lighter-than-air gas such as hydrogen or helium.

In order to provide a source of 'top-up gas' to extend the duration a balloon or dirigible may remain at the elevated location, a second conduit may be provided which can transport helium. Alternatively if hydrogen is used as the fuel fluid and 'top-up gas', a single conduit can be used unless redundancy is required in which case further conduits can be added.

Such a balloon or dirigible can be spherical but is preferably non-spherical ellipsoidal or streamlined in shape. This provides a more aerodynamic shape, which helps reduce horizontal wind drag forces and may provide some lift force.

The conduit is typically a pipe with a circular or near-circular cross-section, through which the fuel fluid flows.

Accordingly, the inside diameter, through which the fuel fluid flows, is preferably from 1.5 to 30 mm. This is sufficient to allow for practical flow rates of from 0.00002 to less than 0.00005 kg/s or from 0.00005 to 3.0 kg/s, preferably from 0.00015 to 1.0 kg/s of fuel fluid.

In order for the fuel fluid to flow through such a long length of conduit, and against gravity, it must be raised to a high pressure at the entry to the conduit. Pressures in excess of 100 MPa, preferably in excess of 200 MPa, more preferably in excess of 400 MPa and even in excess of 600 MPa may be necessary to achieve acceptable flow rates in the conduit. However, if the fuel fluid is hydrogen then much lower pressures are required, with pressures of from 0.2 to less than 1 or from 1 to 100 MPa being appropriate. In order to achieve high pressures the fuel fluid may be provided via a plurality of pressure vessels.

The fuel fluid preferably comprises hydrogen and/or a hydrocarbon fluid. Due to the high pressures necessary for transporting the fluid through the conduit, preferably the hydrocarbon fluid has an average molecular weight of less than 200, preferably less than 150, more preferably less than 100, most preferably less than 50 or even less than 20. In one preferred embodiment, the fuel fluid comprises at least 90 wt %, more preferably at least 99 wt %, most preferably at least 99.9 wt % hydrogen, or even at least 99.99 wt % hydrogen.

In one preferred embodiment the electrical generator comprises a combustion engine, or gas turbine, generating electricity by combustion of the fuel fluid, e.g. with air taken from altitude. In another preferred embodiment, the electrical generator comprises a fuel cell, which can consume hydrogen, as the fuel fluid, generating electricity by reaction of hydrogen with air taken at altitude. This air is usually provided via a compressor and possibly dehumidified from air at altitude.

The generator is typically capable of generating a few kW up to a few MW. Thus, preferably the generator can produce from 0.5 to less than 3 kW or from 3 to 60,000 kW, more preferably from 100 to 20,000 kW, most preferably from above 100 to 1,000 kW of electrical power.

The conduit may be made from a wide range of materials, but strong and light materials are preferred such as composites filled with high strength carbon fibre, or aramid fibre such as KEVLAR™ brand aramid fibre, TECHNORA™ brand aramid fibre, VECTRAN™ brand aramid fibre or THORON™ brand aramid fibre and ultra-high molecular weight polyethylenes such as SPECTRA™ brand polyethylene and DYNEEMA™ brand polyethylene or PBO's such as ZYLON™ brand PBO.

For hydrogen conveying, the conduit may comprise a composite pipe with a liner, such as metal or PTFE, PVDF, polyethylene or other low permeability plastics, to carry the fuel fluid. This combination prevents diffusion of hydrogen and hydrogen loss. If the loads on the conduit are sufficiently low, the entire conduit may be fabricated from PTFE, PVDF, polyethylene or other low permeability plastics.

The tether may comprise one or more reinforcing cables which travel along the outside of the conduit to provide strength. Thus the tether functions to bear the tensions necessary to support the apparatus, whilst the conduit functions to transport the fuel fluid, although it may also carry some tension.

It has been further discovered that such a tether may preferably have a non-circular cross-section to reduce horizontal drag whilst maintaining vertical strength and pressure containment for the conduit.

Horizontal drag on the tether is a significant problem potentially causing the tether to move to a more horizontal orientation, thus lowering the altitude of the platform to below that of the desired elevated location, a problem that can be described as blow-over. This can be exacerbated if the platform enters a region of higher wind speeds which could lead to a catastrophic failure due to excess wind loads.

In a long tether carried by one or more lifting devices at the top of the tether, the weight of the tether and the horizontal wind drag are two main determinants of the tether load. At the top of the tether, the entire weight of the tether is felt by the tether itself, whereas at the bottom of the tether there is relatively little tether weight that needs support, but the wind drag of the balloon or dirigible and the tether itself are present. As a result, the tether will have a maximum inclination to the vertical and be relatively unstressed at its base. However, the tether must be designed to withstand the maximum tension experienced at the top of the tether. Thus, the tether will either need to vary in cross-section, composition or both along its length, which involves manufacturing complications, or suffer the inefficiency of being designed for larger tensions than are experienced in all locations except at the top.

Thus, in a second aspect, the invention relates to an apparatus for providing high altitude services, comprising a platform at an elevated location, the platform being tethered to a substantially ground level location, wherein the tether has a circular or non-circular cross-section, and comprises a series of vanes or aerofoils at intervals along its length to provide lift to the tether from horizontal winds.

The vanes or aerofoils are typically present along the length of the tether and when appropriately aligned to the wind provide lift where it is needed. This provides a reduction in the maximum tension experienced by the tether, allowing it to be of reduced cross-section. The reduction in physical size of the tether reduces its cross-sectional area and the associated drag forces, resulting in a smaller size of balloon or dirigible being necessary.

A non-circular tether can be characterised by the aspect ratio of the cross-section, i.e. the ratio of the length of sides of a rectangle which just contains the cross-section. Aspect ratios of from 1.5 to 20.0 are preferred.

As discussed above, the tether may comprise reinforcing cables so as to provide sufficient strength to the tether. In one preferred embodiment, the tether comprises more than one cable, each being parallel to each other. In this way cables with a circular cross-section can produce a tether according to the invention having a non-circular cross-section. Further cables can be included which may also be aligned with the other cables to produce an elongated cross-sectional tether. For example a tether comprising from 1 to 10 cables is preferred.

As is well-known in the art, a circular cross-section tether would always present the same area to the air irrespective of any twisting action in the tether. However a tether with a non-circular cross-section has the potential to expose a variable area to the flowing air according to the rotated state of the tether.

However, one problem with long non-circular cross-section tethers is that they tend to expose their maximum area to flowing air, rather than expose their minimum area. This is because such long tethers will generally have a low torsional stiffness and align themselves in the flowing air with the minimum strain energy thereby putting the long axis at right angles to the flow direction unless regularly oriented by, for example, vanes.

Thus, their natural tendency to present an increased area can increase the forces on the tether due to flowing air. It is therefore desirable to take steps to ensure that the non-circular cross-section tether tends to expose a minimum area to flowing air.

It has now been surprisingly found that such non-circular cross-section tethers can be made to expose their minimum area to flowing air even though they may have low torsional stiffness.

Such tethers are thus typically elongated in their cross-section, having two well-defined ends to the elongate cross-section. The two ends can be referred to as the leading edge and trailing edge respectively. The leading edge is typically rounded and is intended to be at the most upstream point of air flowing over the tether. Likewise the trailing edge is intended to be the most downstream point of the flowing air. The distance from the most upstream point of the tether to the most downstream point on the tether in a given cross-section, is referred to as the chord length of the tether at that cross-section.

When air flows over such a tether, it creates forces on the tether. At any given time there is a notional point within the cross-section of the tether about which the sum of all the moments induced by such forces, cancel each other out. Such a point is referred to herein as the centre of aerodynamic pressure.

Because of the length of the tether it will generally have a low torsional stiffness. It has been found that if the centre of mass of the tether at a given cross-section is nearer to the leading edge of the tether than is the centre of aerodynamic pressure, then it may be possible that the tether will find a locally stable arrangement to be when it exposes its minimum area to the flowing air, even though the stored strain energy may not be a minimum.

In other words, the centre of mass is preferably nearer to the leading edge than is the centre of aerodynamic pressure in use.

It is typically the case that for an elongated cross-section of tether nearly positioned to expose its minimum area to the flowing air, the centre of aerodynamic pressure will be near to one-quarter the chord length from the leading edge. Thus, in order to ensure that the centre of mass is closer to the leading edge than is the centre of aerodynamic pressure, particular steps need to be taken.

For example, the shape of the tether cross-section is preferably a tear-drop shape, e.g. similar to a helicopter rotor cross-section. However, this alone will not ensure that the centre of mass is sufficiently close to the leading edge. Thus, typically the material density of the tether is greater near to the leading edge than it is in the centre and near to the trailing edge.

Such variation in material density may be gradual or sudden. It may even involve discontinuities and inhomogeneity where other materials, such as optical fibres and reinforcing cables, pass through the tether. However, any variation in material density together with variations in shape need to provide the centre of mass being suitably positioned within the tether.

Thus, preferably the centre of mass of the tether is less than 25% of the chord length from the leading edge. More preferably it is less than 24% of the chord length from the leading edge. Typically it will be from 10% to 24%, more preferably from 15% to 24% of chord length from the leading edge.

Naturally, as the tether connects the substantially ground-level location to the platform it will carry a tension force. It has been found that improvements in tether stability can be achieved if the centre of tension is nearer to the leading edge than is the centre of aerodynamic pressure in use.

It has been found that if the centre of tension is downstream of the centre of aerodynamic pressure, the tether may be prone to twisting so that the longitudinal axis inclines at a large angle to any wind. Once this process begins, more and more of the length of the tether will assume this attitude, potentially giving higher wind loads than if the tether is pointed into the wind.

The centre of tension is that point in a cross-section of the tether about which all the moments established by the tension forces (which are directed normal to the plane of the cross-section) carried by the tether in that cross-section add up to zero.

Thus preferably the centre of tension of the tether is less than 25% of the chord length from the leading edge. More preferably it is less than 24% of the chord length from the leading edge. Typically it will be from 10% to 24%, more preferably from 15 to 24% of chord length from the leading edge.

It has been surprisingly found that improvements in tether stability can be achieved if the centre of shear is nearer to the leading edge than is the centre of aerodynamic pressure in use.

The centre of shear is the point in the cross-section of the tether through which, if any notional force is applied in the plane of the cross-section, the force causes no rotational movement on the tether. In other words the force applied results in pure deflection of the tether without any rotation thereof.

Thus preferably the centre of shear of the tether is less than 25% of the chord length from the leading edge. More preferably it is less than 24% of the chord length from the leading edge. Typically it will be from 10% to 24%, more preferably from 15 to 24% of chord length from the leading edge.

It has also been found that it may be optimally desirable that the centres of mass, tension and shear are in close proximity to each other, whilst remaining nearer to the leading edge than the centre of aerodynamic pressure. Thus the centres of mass, tension and shear are preferably within a region of less than 10% of the chord length, preferably less than 5%. On occasion it is possible that one or two of these centres may be further away from the leading edge than the centre of aerodynamic pressure, but not all three if a dynamically stable system with low drag is to be achieved.

The tether may also comprise fins which may be powered to provide active control. Such fins may be ailerons forming part of the aerofoils.

In one preferred embodiment, the aerofoils and ailerons are provided by a plurality of gliders (heavier-than-air aircraft intended for unpowered flight) attached to the tether and spaced apart accordingly. In a preferred embodiment the gliders are moveably attached to the tether. The movement of the gliders and their ailerons can be provided by power generated locally, such as from a wind energy turbine, typically of variable pitch, variable speed design. The attachment of the gliders to the tether may be removeable to facilitate ready attachment or detachment e.g. when the tether is paid out or recovered.

Alternatively or additionally, the tether may comprise a plurality of flags located along the length of the conduit. Such flags have been found to prevent flutter of the non-circular cross-sectional tether.

Although non-spherical cross-section tethers provide significant advantages, they present a difficulty when storing the tether before and after the apparatus has been deployed at altitude.

A circular cross-sectional tether can simply coil onto itself, whereas a non-spherical tether may comprise elongate regions which limit or restrict any coiling or deformation. Furthermore, any elongate regions could be easily damaged unless this problem is addressed.

Thus, in a third aspect, the invention relates to a non-circular cross-section tether as described herein, which is held within a sheath having an opening for the tether in its cross-section. The tether in its sheath may thus be coiled or stacked.

The sheath may be provided as an elongate sheath, or, for example, it could be provided on the surface of another object, having the appearance of a screw thread on the outside of a shank. The tether can then by wound around the shank and enter its sheath provided by the screw thread.

As discussed above, with so much power available, options not previously available for enhancing the performance of the information services provided become possible.

For example, in a preferred embodiment, the apparatus comprises a gyroscopic and/or gravitational stabilisation means. Such an apparatus can act to maintain a more or less fixed attitude in the atmosphere. This enables transmissions and reception to be closely directed from the apparatus through the atmosphere and to the Earth's surface, to other such apparatus or to satellites. Without such a stabilisation means, the movement of the apparatus would make directional transmissions more difficult.

Increased power available at the platform and possibly tether, enables highly powered telecommunication signals to be transmitted to the Earth, to other such apparatus or to satellites. This can provide several advantages. For example, the signals become capable of penetrating buildings or into some underground installations. Another benefit is that equipment may be able to operate with smaller antennas which are more convenient and possibly portable.

Thus the platform typically comprises information services apparatus. For example, the apparatus may comprise electromagnetic transmitters and/or receivers for delivering telecommunication services to the surface of the Earth.

In a preferred embodiment, the tether also comprises an optic fibre cable (or one or more optical fibres) from the substantially ground level location to the elevated location to transmit and receive high bit rates to transmitters/receivers at the elevated location. From the substantially ground level location the optical fibre can be linked to ground-based centres of communication by optical fibre. In the case when the substantially ground level location is a ship, then it is desirable to arrange for an optic fibre cable (or one or more optical fibres) to travel from the mainland under the sea to a buoy, connected by an optical fibre or other means to the ship. Communication to and from the ship can then be transmitted by optical fibre via the sub-sea optical fibre cable. Alternatively microwave transmission directly from the platform to and from receivers at ground level can be used, or microwave transmission to and from near the ground level tether location.

In a preferred embodiment, the apparatus employs radio-over-fibre technology.

Thus, in a fourth aspect, the invention relates to an apparatus for providing information services at altitude, comprising a platform comprising information services apparatus at an elevated location, the platform being tethered to a substantially ground level location, the tether comprising an optic fibre cable (or one or more optical fibres) connecting the information services apparatus to a base station in the vicinity of the substantially ground level location, wherein the base station comprises a means for modulating light by an electrical signal, the information services apparatus comprising an optical-to-electronic conversion means and at least one antenna, the arrangement being operable to transmit the modulated light along the optical fibre cable to the information services apparatus where the signal is converted to electronic form and transmitted by the antenna. A two-way system is also possible, where microwave signals are received by platform receivers and the electrical signal used to modulate light is transmitted down the tether optical fibre cables for conversion at the tether base to an electrical signal.

Typically the radio signals will be wireless signals, e.g. of a few or many GHz frequency.

Radio-over-fibre is particularly advantageous because there is very low signal attenuation in transmission to the platform and most of the information processing apparatus can be located at the base station thus reducing the weight of the platform. An additional advantage is the possibility of developing the type of service the platform delivers without changing the equipment at altitude.

Thus, typically modulation and switching functions can be carried out at the base station. Other functions such as frequency up-conversion and multiplexing can also be performed at the base station. Thus some of the information services apparatus only require optoelectronics and amplification functions at the platform.

It is also believed that for many applications translational movement of any apparatus at altitude is much less problematic than rotational movement. For communication at large distances, even a small change in the direction of a directed transmission will result in the transmission or reception to and from the Earth being significantly off target. However, if the direction can be fixed within narrow limits, then in some cases translational movements result only in relatively small deviations from the target. Thus, it has been found that translational movement due to winds can be more easily tolerated than rotational movement. Managing the platform angular velocity around a vertical axis is important in applications involving multiple cells where 'handover' from one cell to another by ground stations can be accommodated at a maximum rate.

Thus, in a fifth aspect, the invention relates to an apparatus for providing information services at altitude comprising a platform comprising information services apparatus at an elevated location, the platform being tethered to a substantially ground level location, wherein the platform is contained within a shroud to which it is not rigidly connected. Typically the platform is connected to the tether by a bearing arrangement allowing relatively free rotation with respect to the tether.

It has been found that the platform is protected from the high winds by being located within a shroud. Furthermore, as the platform is not rigidly connected to the shroud or the tether, any rotational movement experienced by the shroud or the tether is not transferred to the platform. The shroud thus shields the platform from the winds and provides a volume of quiescent air or gas within which the platform is mounted. Thus, although translational movement of the shroud can be transferred to the platform, little or no rotational movement is transferred and directed information services are significantly improved.

In a preferred embodiment the shroud is a balloon or dirigible and the platform can be suspended by the tether but free to rotate about all axes with respect to the tether. For example, the shroud may be a balloon or dirigible suspended beneath a larger balloon or dirigible providing the lift for the platform.

Furthermore, the benefit of the shroud is further and significantly enhanced if it is combined with a gyroscopic and/or gravitational stabilisation means, as discussed above. In such an embodiment, a very stable attitude can be achieved, providing for significantly enhanced directed information services. Furthermore, in some cases the shroud can be the balloon or dirigible itself.

It is also beneficial if the shroud is streamlined to reduce any drag forces it experiences.

It is furthermore desirable if the shroud protection embodiment is combined with the fuel fluid aspect of the invention discussed above.

The tether and platform according to the invention may also be susceptible to lightning strikes. Such strikes can be very hazardous, particularly if a fuel fluid is passing through a conduit in the tether. Thus, preferably the conduit is non-electrically conducting. This can be achieved, for example, by ensuring that any metal components of the tether to for example change the position of the centre of mass are interrupted every so often and the adjacent ends insulated from each other, e.g. every few metres, to break any electrical pathway. Alternatively the conduit may be essentially free of electrically conductive elements.

Whilst the conduit is preferably non-electrically conductive, the tether itself may be non-electrically conductive too or alternatively may comprise a lightning strike conductor electrically connecting the substantially ground level location to the platform. Thus, any lightning strikes would be carried by the conductor and not influence the non-conductive conduit.

In a sixth aspect, the invention relates to an apparatus for providing information services at altitude comprising a platform comprising information services apparatus at an elevated location, the platform being tethered to a substantially ground level location, wherein the tether comprises at least two electrical power cables operable to transport electrical power from the ground level location to the platform.

In this embodiment, it will not be possible to ensure that the tether is non-electrically conducting. Therefore, preferably the tether also comprises a lightning strike conductor electrically connecting the substantially ground level location to the platform. In one embodiment the lightning strike conductor may include one of the electrical power cables in a non-insulated form. Thus, although lightning strikes may not be prevented, their effect can be greatly minimised by providing the electrically conductive path in the tether.

For example, the lightning strike conductor may comprise an aluminum strip or other conducting material, preferably with a cross-section of from 100-400 $mm^2$ cross-section area.

It is also preferred that the power cable or cables are insulated. It has been found that high voltage cables from 3.3 kV to 330 kV are suitable.

It has also been found that there is a risk that water may form a conductive pathway on the outside of the tether. Thus, if the tether is non-conducting the water can nevertheless provide a conductive pathway and the problem of lightning strikes remains a problem.

Thus, in a seventh aspect, the invention relates to an apparatus for providing high altitude services, comprising a platform at an elevated location, the platform being tethered to a substantially ground level location, wherein the tether is coated with a hydrophobic material.

Thus, if any liquid forms on the surface of the tether it will generally not form continuous pathways, thus preventing the possibility of an electrical pathway forming. Additionally, a hydrophobic coating on the tether surface can prevent the formation of ice on the tether. Such ice can promote aerodynamic instability in particular in the case of non-circular tethers.

It is also preferable if the tether comprises a moveable vehicle which is operable to inspect the tether for damage, possibly make minor repairs and providing a de-icing capability.

As such high altitude platforms will generally be located in the vicinity of human population areas, consideration with respect to aircraft safety and regulations must also be given. One such safety consideration is the requirement that the tether contain a multitude of lights which may operate continuously or intermittently, in order to alert aeroplane pilots of the presence of the tether.

However, providing lights and providing sufficient power along the length of the tether can involve significant weight increases, which in general are to be avoided. Thus, a system which can provide such lighting without significant additional weight would be highly desirable.

Thus, in an eighth aspect, the invention relates to an apparatus for providing high altitude services, comprising a platform at an elevated location, the platform being tethered to a substantially ground level location, wherein the tether comprises an optical fibre cable at least substantially from the substantially ground level location to the platform, the optical fibre cable comprising a plurality of couplers spaced along the length of the optical fibre cable, each coupler adapted to divert a fraction of the light in the optical fibre cable and direct it to a respective light emission means.

Typically the light emission means comprises a collimator and may, for example, comprise one or more lenses, some mirrors or diffraction gratings (either conventional or holographic).

The light transmitted along the optical fibre cable is preferably intermittent, in order to provide a flashing light effect at the respective light emissions means.

In a preferred embodiment the light emission means are evenly spaced apart. Spacing between the light emission means can be from 50 to 200 m.

Thus, such a tether may comprise from 20 to 200 such light emitting means. Thus, the amount of light diverted by each coupler is preferably in the range of from 0.5 to 5.0% of the light in the optical fibre at that point.

The optical fibre in this embodiment is typically a separate optical fibre employed for conveying optical signals for use with information services apparatus according to other aspects of the invention.

Such an arrangement is low weight, compact, can present little additional wind resistance and involves no local power requirements, thus simplifying the apparatus required.

Any of the features disclosed herein may be combined with any other feature to provide embodiments according to the invention.

As may be appreciated, the apparatus described herein can be employed in a wide variety of technical fields where high altitude platforms would be desirable.

The invention will now be illustrated, by way of example and with reference to the following figures, in which.

Figure 3:
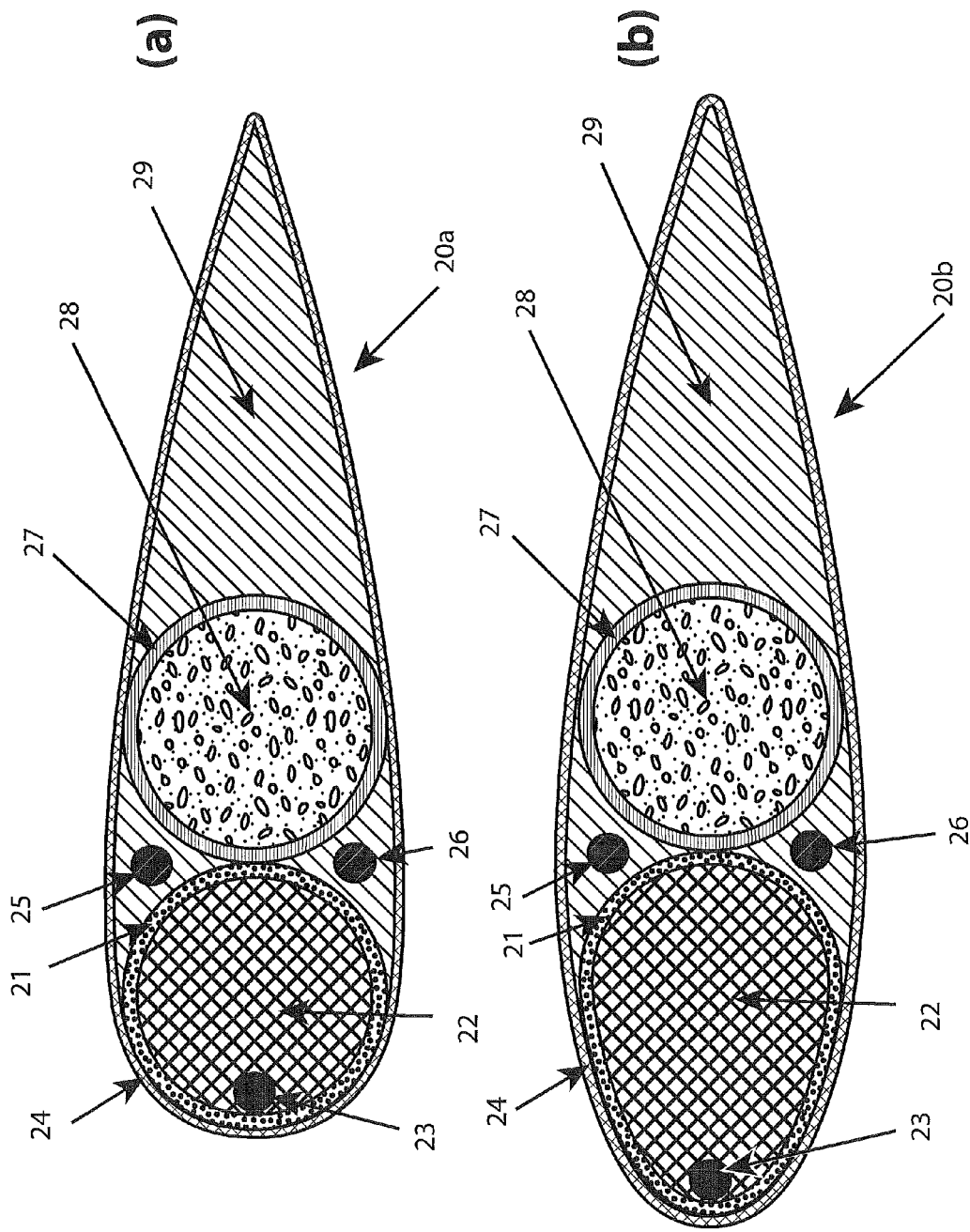

FIGS. 3(a) and (b) are sectional plan views through the cross-section of two tethers for use with apparatus according to the present invention.

FIGS. 4(a) to (f) are various views of gliders for providing lift to the tether along its length.

FIGS. 5(a) to (h) are various views of portions of a tether for use with an apparatus according to the present invention.

FIG. 6(a) and (b) are sectional views through a tether for use with an apparatus according to the present invention encased in a sheath.

FIG. 7(a) to (c) are sectional views through a tether for use with an apparatus according to the present invention encased in another sheath.

FIGS. 8(a) and (b) are views of an apparatus according to the present invention.

Figure 9:
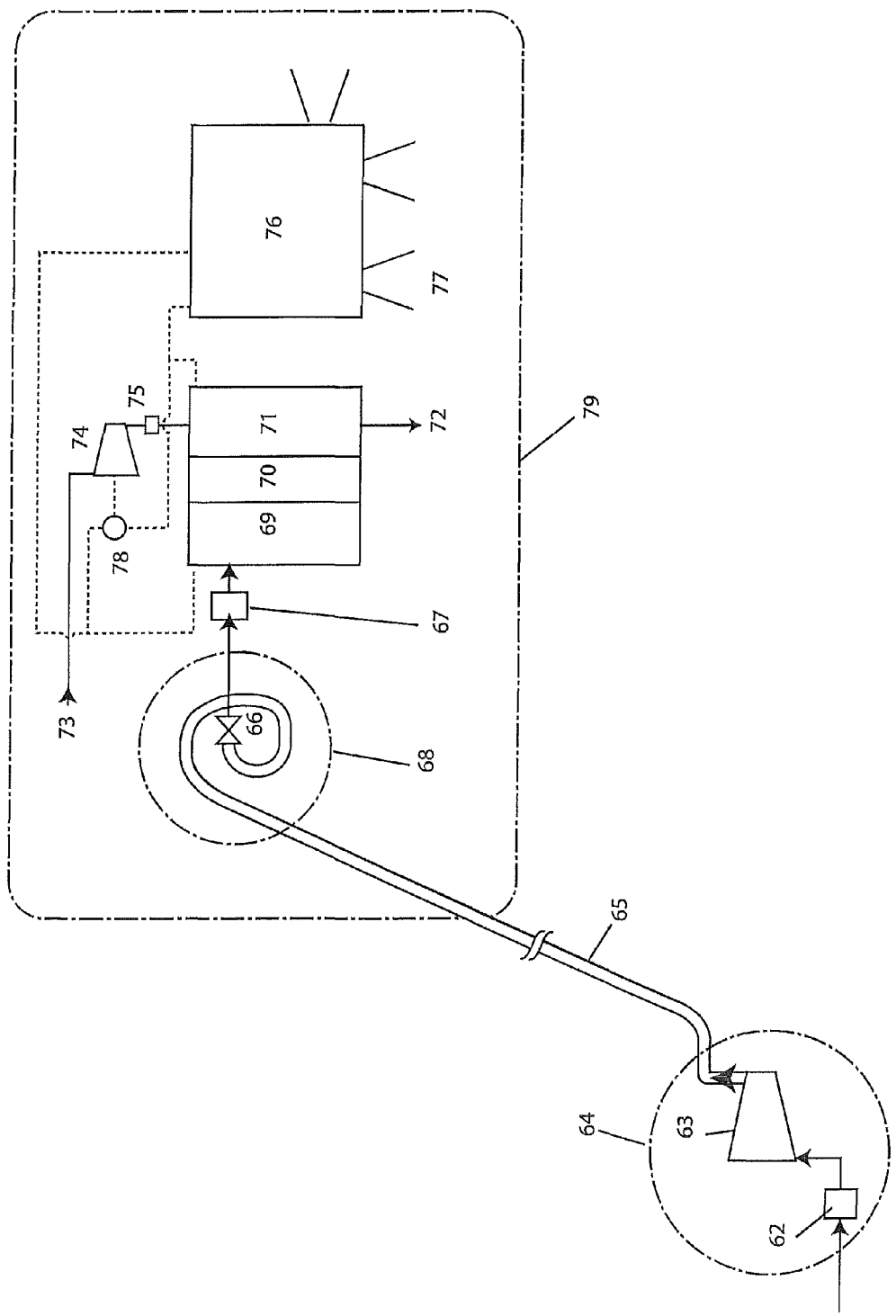

FIG. 9 is a schematic representation of elements of an apparatus according to the present invention.

Figure 10:
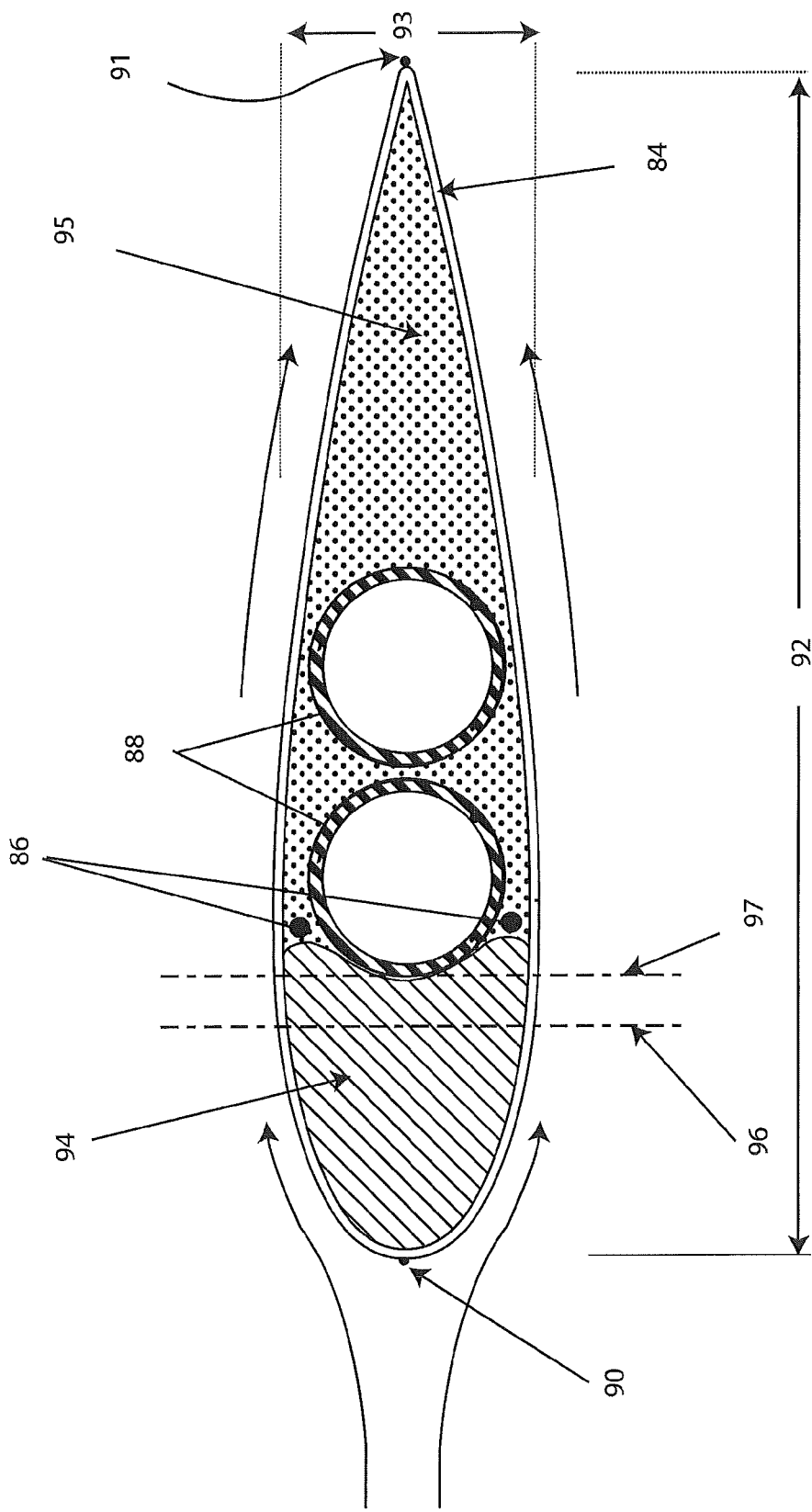

FIG. 10 is a sectional view through a cross-section of a tether according to the present invention.

FIG. 11 is a schematic representation of a further apparatus according to the present invention.

FIG. 12 is a schematic representation of a light emission means for use with a tether according to the present invention.

Figure 1:
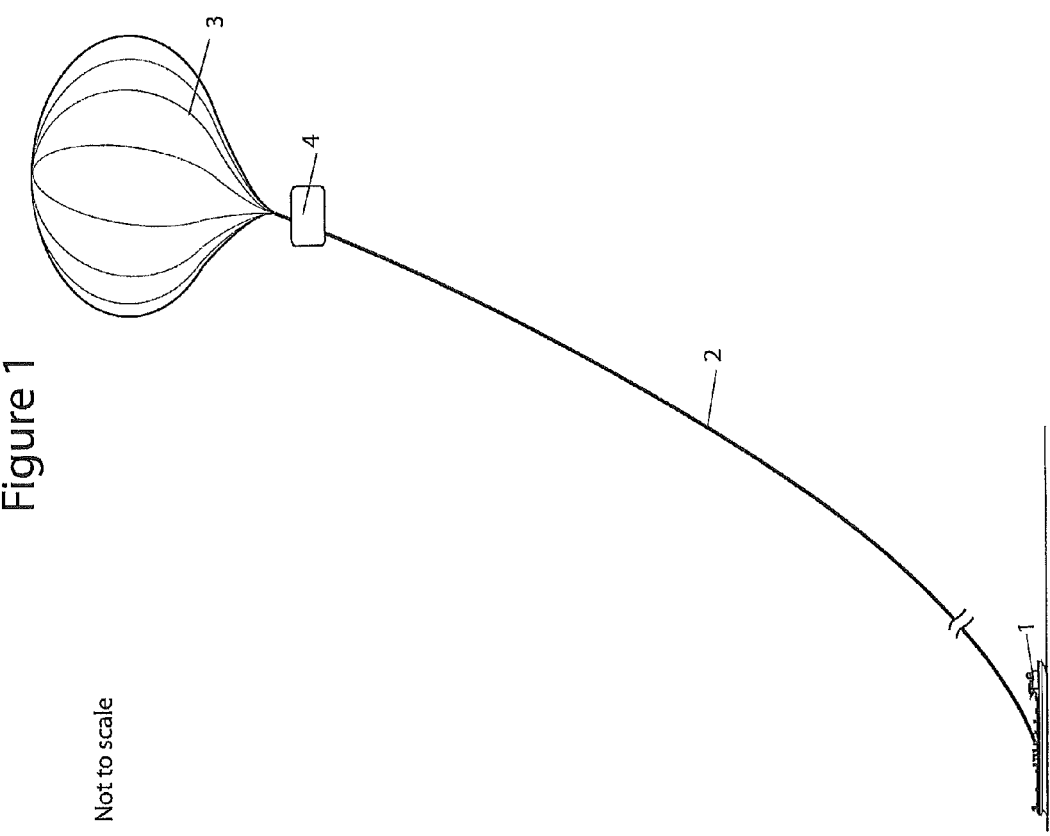
FIG. 1 is a schematic representation of an apparatus according to the invention.

Turning to the figures, FIG. 1 shows an apparatus according to the invention comprising a high altitude platform 4 supported by a balloon 3 and attached to a tether 2. The tether is attached to a ship 1 located at sea level, being a ground level location.

The platform 4 comprises an electrical generator in the form of a fuel cell, although it could be a gas engine or turbine, jet engine or a diesel engine and the like.

The platform 4 also comprises a variety of information services apparatus, such as internal antennas, multi networks for wireless internet, a 700 horn antennae to supply 1 to 100 km diameter mobile phone or WIMAX™ technology cells, microwave backhaul antennas, television transmitters, positioning system transmitters, aircraft warning systems, e.g. radar reflectors and light strobes. It may also comprise one or more telescopes for astronomical observations, one or more cameras for aerial photography or LIDAR equipment for atmospheric monitoring, as well as other receivers for electromagnetic radiation.

The tether 2 comprises a KEVLAR™ brand aramid pipe with a 15 mm outside diameter and 12 mm inside diameter made of composite material with a PTFE liner. The pipe is reinforced by four additional KEVLAR™ brand aramid cables of 15 mm diameter to provide a cross-section to the tether which is non-circular but with centre of mass, tension and torsion close together and upstream of the quarter chord point by a suitable tail arrangement (see FIG. 2).

Balloon 3 is 600,000 cubic metres capacity of ellipsoid shape with a horizontal diameter of 158 m and a vertical height of 46 m and is filled with helium to support the platform 4 which weighs 8 metric tonnes.

The ship 1 comprises a store of hydrogen, and optionally a hydrogen generation plant, and can pressurise the hydrogen to 350 bar pressure by two high pressure compressors (not shown) so that it can flow up the tether to the platform 4. Once the hydrogen arrives at the platform it passes to the fuel cell, whereupon electrical energy is generated at altitude. The electrical energy produced is typically from 10 to 10,000 kW, e.g. 500 kW, and is more than enough to provide high strength signals for use with the information services apparatus.

Figure 2:
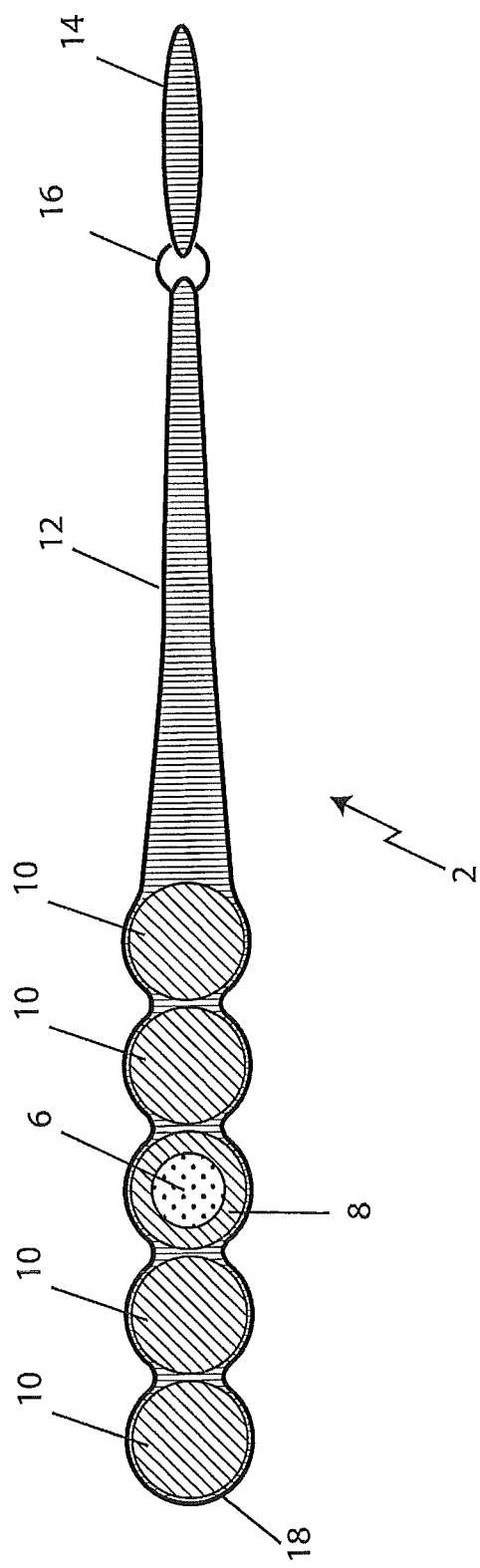
FIG. 2 is a sectional plan view through the cross-section of a tether for use with apparatus according to the present invention.

FIG. 2 shows a cross-section through a portion of the tether 2 used in FIG. 1. The tether 2 comprises a conduit 6 which carries the fuel fluid, e.g. hydrogen. It is strengthened by a wall 8 of composite material.

Also provided are four strengthening cables 10 which do not carry fuel fluid but are there to lend strength to the tether. Also provided is a tail portion 12 and a fin portion 14 attached to tail portion 12 by a ring or actuator 16. The tether is surrounded by a skin 18 to maintain integrity of the tether 2. The elongate nature of the cross-section helps to reduce horizontal drag induced by high cross-winds. The actuator 16 may be operable to provide active control to prevent adverse tether movement. The shape of the space between the cables 10 may be modified to allow less or no indentation between the cables by for example the insertion of low density foam or by using non-circular cables. Such an arrangement can improve aerodynamic performance and lower drag.

FIGS. 3(a) and (b) show a cross-section through a portion of alternative tethers 20a or 20b for use with the present invention. The two tethers are distinguished from one another in having slightly different cross sections to allow in case 20a, a tether that is easier to manufacture and in case 20b a tether with superior aerodynamic performance and lower wind drag.

Tethers 20a and 20b both comprise a tension member 22 made of a high strength material which can be composite, with a nylon sheath 21, and a hydrogen conduit 28, and with a thin low hydrogen diffusivity wall 27 to hold high internal pressures of up to 300 Bar hydrogen. Fibre optic cable bundles 25 and 26 provide communication links and a dense steel or other cable 23 provides weight to counterbalance the tether system to ensure that the centre of mass is close to or preferably upstream of the aerodynamic centre of lift. The tether is encased by a plastic sheath 24 with a hydrophobic coating (polyethylene, or similar material) possibly reinforced by Aramid fibres pitched and spaced to ensure that the centre of torsion is close to the centres of mass and aerodynamic lift. The steel cable 23 may or may not be continuous in order to provide an electrically conducting path or not. If an electrically conducting path through the steel cable is provided, regular piercings of the sheaths 21 and 24 can be provided and a small discharge wire connected to ensure charge discharge giving some protection against lightning strikes.

The space 29 is filled with a low density material such as a polyurethane foam of density around 80 kg/m$^3$ and a crush strength of at least 5 bar or cross wise struts to provide the necessary strength and lightness to prevent the sheath 24 from deforming when subject to wind loadings or tensioning, and have the necessary torsional and fatigue resistance, mass distributions and robustness to withstand stresses induced when wound and stored.

Figure 4:
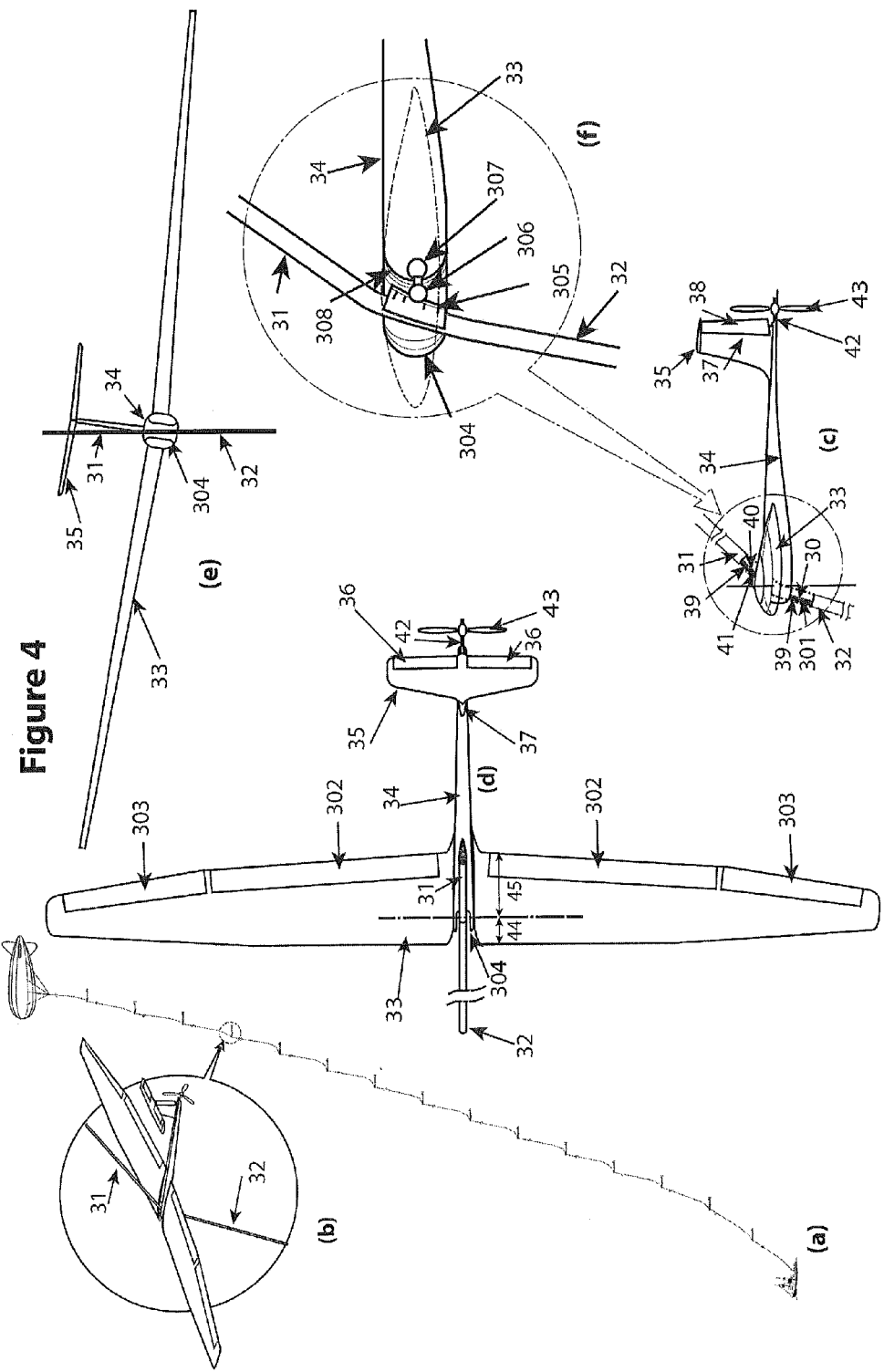

FIG. 4 shows views of the 'glider arrangements' for supporting the tether at intermediate heights. Fifteen 'gliders' (not to scale) are shown in FIG. 4(a) supporting the tether linked to a dirigible inside which there is a very high altitude platform.

FIG. 4(b) shows an enlargement of one of the gliders. FIGS. 4(c), 4(d), and 4(e) show respectively side, plan and frontal elevations, with the frontal elevation showing a slightly banked glider to illustrate the tether passage and tail plane arrangement. FIG. 4(f) shows in more detail the elevation perspective of possible linkage arrangements between the glider and tether.

The gliders may incorporate rechargeable batteries connected to wind generators and solar cells to allow power for strobe aircraft warning lighting and intermediate altitude services as well as radar reflectors and transponders. A method for measuring strain and deducing stress on the tether local to the glider may be incorporated, and fed into the glider control system along with other system inputs for example, a global positioning system and inertial measurements. The control system can alter the glider lift to allow the steepest possible tether without exceeding tether design stresses.

The gliders may be of different sizes to cater for the very different wind conditions at different altitudes and have different spacings down the tether. For example a design of tether with 15 glider supports to provide lift for a 20 km altitude platform system augmenting the lift of a 58 m diameter balloon, might have gliders of 4 square meter wing area per glider between jet stream altitudes of 7 km and 13 km, but be up to eight times this size at 19 km or three times this size at 1.5 km with graduations in between. One aspect of the 'glider' design is to have the centres of mass and lift close to the tether but with the centre of mass slightly behind the tether attachment point. FIG. 4(b) shows an exaggerated change of angle of the tether 31 above a glider as it threads through the glider. The glider is providing lift giving a tension in the lower tether 32 higher than in the upper tether 31. This allows for a tether of constant cross section, and enables less variation in the tether tension, utilising the high lift to drag ratio of the gliders.

FIG. 4(c) shows a sideways elevation. The tether sheath may not be continuous as shown here, or continuous as shown in FIG. 4(f), depending on the detail of the attachment mechanism between the glider and the tether. Depending on the desirable cable manufacturing length or if intermediate services are required, the various cables can have joins for the fibre optic bundles 39, the hydrogen supply line shown below the glider 30 and above 40 after a possible branch, and the tension member 301 below the glider and 41 above the glider. If there is a branch in the hydrogen line, alternative fuel cell power can be made available for the glider. The thin tapered wings 33 provide high lift for low drag at high windspeeds.

Normally the balloon or aerostat would have sufficient lifting capacity to carry the tether, payload and all the gliders in stagnant air conditions. It is possible to envisage a situation where reliance was placed on some lift contribution from the gliders or other lifting surfaces such as elevated kites if the site was one where the frequency of relatively windless days was very low.

A secondary tether (not shown) is attached to the rear of the fuselage 34 and an attachment point someway above the main tether attachment point, to ensure the tail does not droop and risk entanglement with the tether, if the centre of mass is behind the tether attachment point. If the centre of mass is in front of the attachment point the additional tether needs to be below the glider. A variable pitch and speed propeller 43 of less than 1 m radius, normally mounted on the rear of the glider with a generator, provides electrical power and is connected by a shaft 42 to the glider. Aircraft strobe lights (not shown) as described in the relevant air traffic regulations but typically on the tail and wings, normally taking less than 100 Watts are fed from re-chargeable batteries with days to a few weeks storage. The tail fin 37 with aileron 38 and tail aerofoils 35 are fairly conventional, providing stability and control. The tail assembly can be as shown or the aerofoils can be at the fuselage level or below.

In FIG. 4(d) a plan view shows the tether sandwiched in the fuselage between spurs 304. These can be designed to allow quick fixing and the movement of vehicles up and down the tether. The centre of aerodynamic lift for the glider is shown between lengths 44 and 45. Ailerons 302, 303 and 36 provide bank and lift control. In FIG. 4(e) a front elevation shows the glider slightly banked and the arrangement of the tail-plane 35 and vertical strut 37.

FIG. 4(f) shows a detail of the attachment of the tether to the glider. 305 is a clamping device, clamping the strong tension member 301 of the tether, joint 306 allows rotation around a horizontal axis normal to the tether, joint 307 allows some degree of rotation around an axis more nearly parallel to the tether.

FIGS. 5(a) and (b) show a tether 51 with lifting devices 52 situated on the tether in a side wind 50. These lifting devices can be used as an alternative or as well as the gliders. In (a) the side wind is very modest and the tether is more or less vertical. In (b) the side wind is strong heeling the tether over to an appreciable angle 506 to the vertical. It is desirable for the lifting devices to have a high lift to drag ratio to avoid excessive stresses in the tether and prevent 'blow over'. In this context it is desirable a section 53 is placed at the tip end of the lifting elements 52 such that the 'secondary flow' induced by the pressure difference across individual lifting elements is kept small. The leading edge of the lifting element surprisingly should be rising in the direction of flow to ensure that the angle of attack of the leading edge is not too acute when the tether is subject to severe winds otherwise the lifting elements might stall leading to loss of lift and blow over.

FIGS. 5(c) to (f) show different types of lifting devices (57, 58, 59 and 60). The lifting devices are all designed to give maximum lift at the design wind speed profile and associated tether angle. FIG. 5(g) shows a different type of lifting device where a multiplicity of small grooves and protrusions are made on the surface of the tether 51. FIG. 5(h) shows a cross section through the tether (A-A) shown in 5(g) with an expanded detail. The leading edge of the small protrusions is at a modest angle to the horizontal 501, typically around 10 degrees if the critical design condition for the tether is for a 30 degree camber to the vertical at design windspeeds. Similarly the angle 502 would be about 5 to 10 degrees to ensure a good lift to drag ratio. The protuberances 503 and the hollows 504 need to be sufficiently large such that they have significant length compared to the boundary layer thickness of the aerofoil (typically 0.1 to 0.5 mm) and there is sufficient depth to avoid secondary flow being a major issue. 22 shows the tension member, with a sheath 21 and the aerofoil sheath 24. 505 shows a strip attached to the aerofoil which supports the structure of 503 and 504.

FIG. 6(a) shows the detail of a possible protective sheath 61 for an aerodynamic tether 63 similar to that shown in FIG. 3a. When an aerodynamic tether is stored at for example the substantially ground level location, two main sets of options exist: either the tether can be coiled on a drum or laid out in a container or on a deck. In both options there is likelihood that the less strong tail section can be damaged by the weight and tension present in the very strong and relatively heavy tensile member in the front of the aerofoil. To guard against such likelihood a protective sheath 61 can be laid onto the tether prior to coiling. Provided the tether is 'encouraged' to enter fully into a sufficiently configured internal channel 62 so that its tail does not cross a line 64 representing the maximum intrusion of another tether sheath, then the tether is well protected. Such 'encouragement' can be provided for by arranging for the walls in the internal channel 62 to be not quite parallel, but closer to each other near the entrance 64 than in the depths of the channel 62, and during coiling the blunt strong tether cross section will be capable of forcing an entry but then be restrained. If a protective sheath is used for the full length of the tether, an additional coil or deck arrangement needs to be in place so that as the tether is paid out the sheath being removed from the tether is itself coiled or stored prior to being used when the tether is recovered.

FIG. 6(b) shows a cross section of a protected tether on a drum or laid on the base of a container where the fragile tail sections of the tether are protected.

Figure 6:
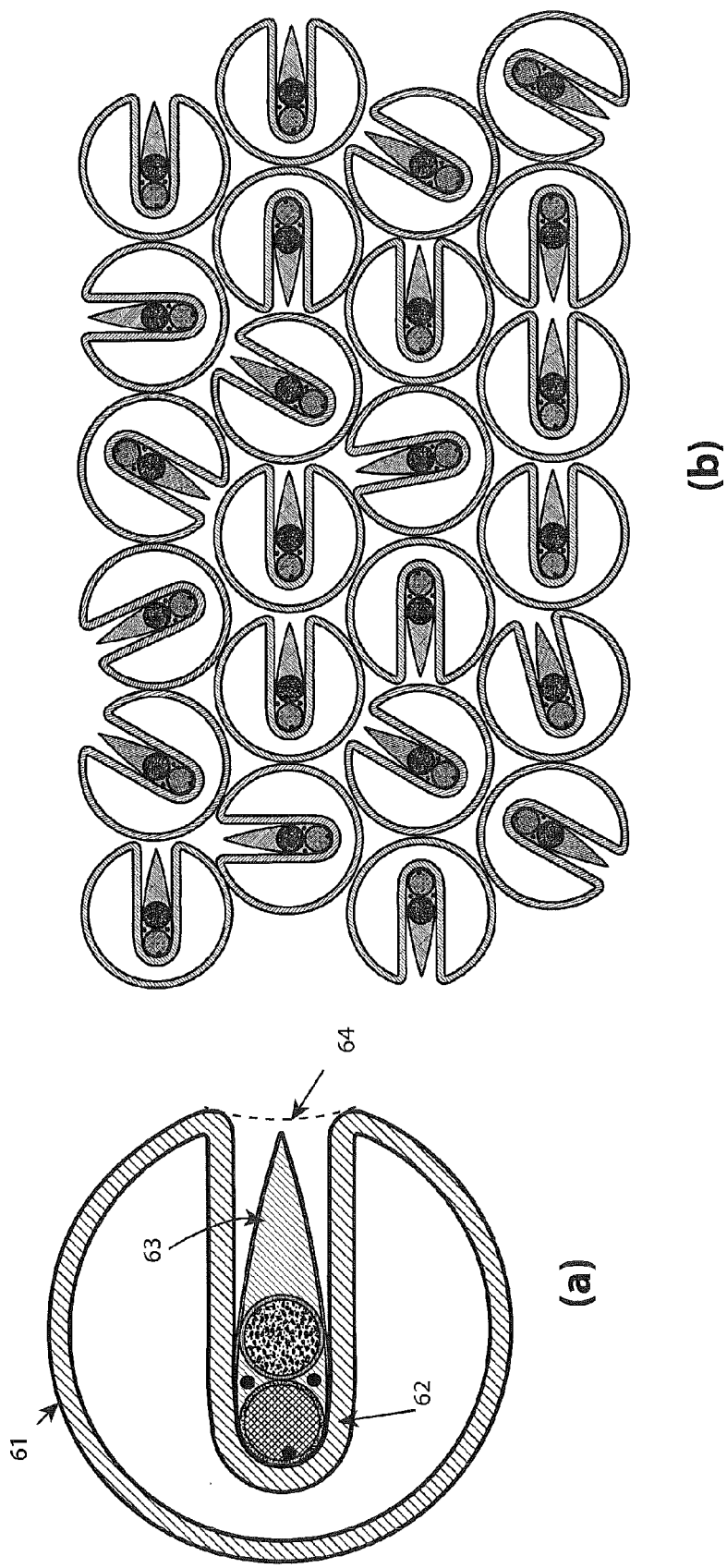
Figure 7:
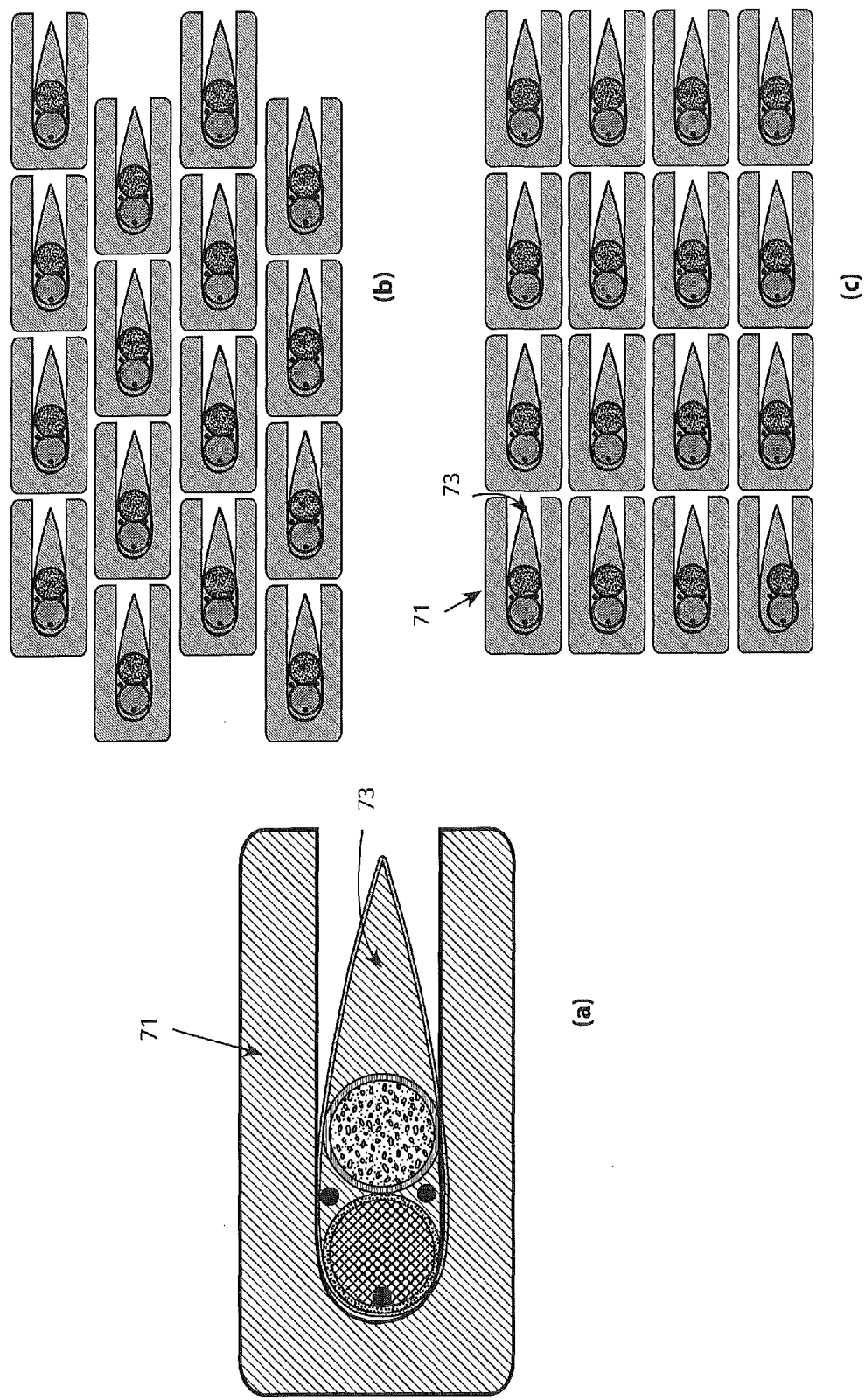

FIG. 7 shows a rectangular protective sheath arrangement, taking up less volume than the circular arrangement described in FIG. 6 but more difficult to stack correctly in the orientation described in FIGS. 7(b) and 7(c). In FIG. 7(a) the sheath 71, which can be solid as shown or hollow or be a more complex structure, protects the tether 73, also with the potential of having the inner walls of 71 slightly convergent thereby causing the tether to be encouraged to be situated full into the protected cavity.

Figure 8:
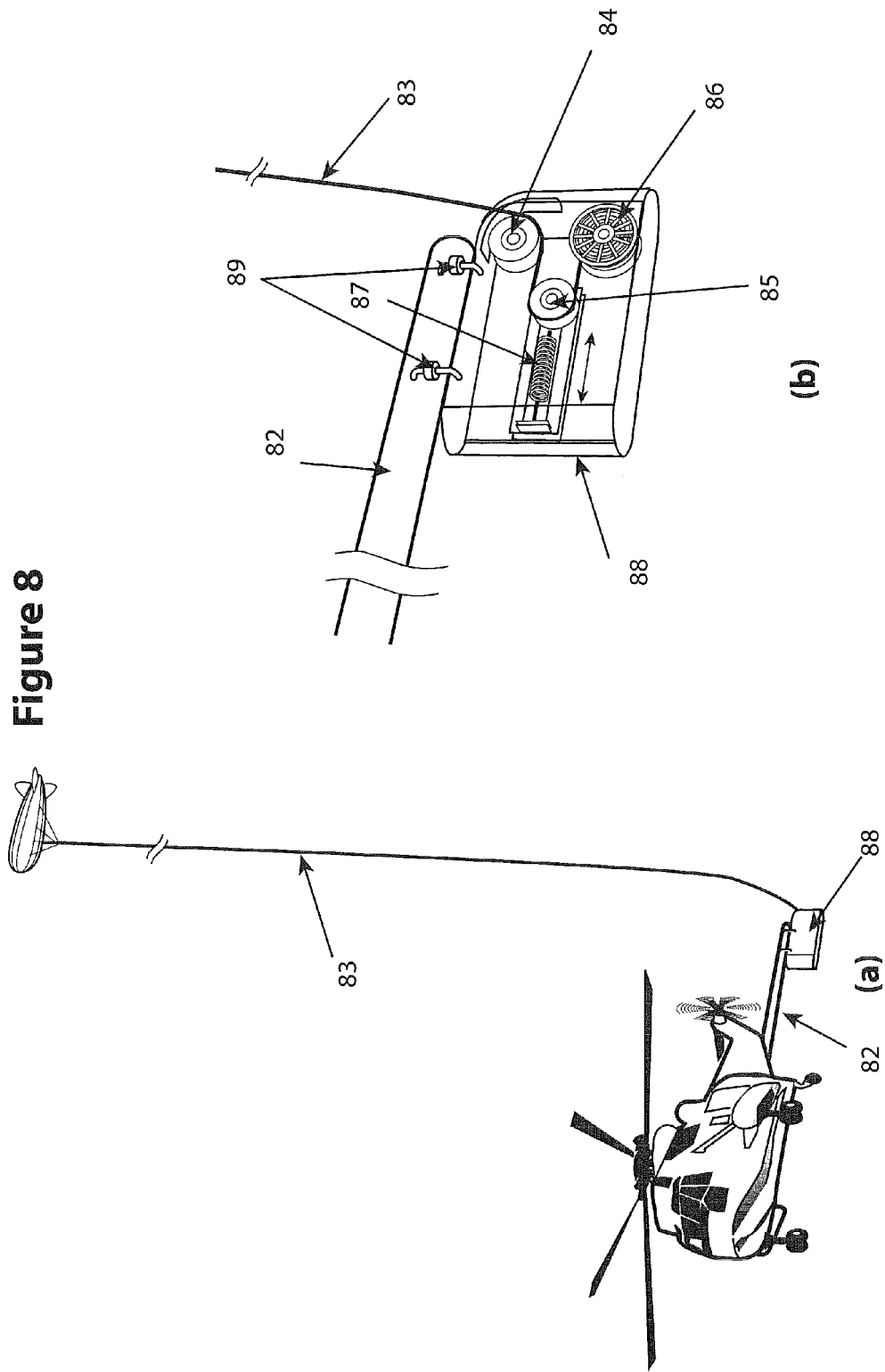

FIG. 8 shows a helicopter delivery system, allowing an elevated high altitude platform to be moved when flying to a site unsuitable for launching and retrieving such a platform. Only a light tether arrangement capable of withstanding high side winds can practically be towed and erected in such a manner. FIG. 8(a) shows a helicopter with a long boom 82 carrying the winching and control gear 88 from which the tether 83 and an aerostat or balloon is flown. The diagram is not to scale. FIG. 8(b) shows outline detail of the winching and control gear, consisting of a winding spool 84, a tensioning spool 85, with spring arrangement 87, which can be replaced by hydraulic actuators, and a coiling spool 86. Protective arrangements as described in FIGS. 6 and 7 are not shown. The whole assembly is within a streamlined casing 88 to allow the extra drag induced on the helicopter to be manageable. Quick release fastening arrangements 89 tie the assembly to the helicopter boom 82.

FIG. 9 shows more detail of the fuel management and power system of the platform shown in FIG. 1. Shown is a hydrogen pressurisation system within a spool 64 at the ground level location, conduit 65 and high altitude platform 79.

The pressurisation system within a spool 64 comprises a low pressure rotating seal 62, through which the hydrogen passes to a compressor 63 prior to the hydrogen flowing up the conduit 65 in the tether.

Once at the platform 79, the conduit enters an upper spool 68 with a let down valve 66. The hydrogen then flows through a rotating seal 67. In another embodiment the spool 68 and rotating seal 67 may be omitted. In a further embodiment there may be hydrogen storage on the platform. On the platfoun the hydrogen flows into the fuel cell made up of an anode 69, a membrane 70 and a cathode 71. Atmospheric air 73 is compressed in compressor 74 and passed through dehumidifier 75 before entering the cathode 71. Water, and exhaust air (mainly nitrogen) is expelled via outlet 72.

Power from the fuel cell drives a motor 78 which in turn drives the compressor 74. Other uses of the power are the payload electronics 76 supplying transmitters 77 as well as any platform stabilisers (not shown).

Compression to one atmosphere allows for a smaller and more compact fuel cell but can consume up to a third of the power generated. This power requirement can be reduced by operating the fuel cell at a lower pressure or by generating power by expanding the nitrogen exit stream from the fuel cell in a turbine or by increasing the oxygen concentration of the fuel cell inlet air stream by a suitable separation process.

FIG. 10 shows a section through a tether according to the present invention with two fuel fluid pipes. The tether comprises a skin 84 which contains two optical fibre cable bundles 86 and two conduits or cables 88. The cross-section is non-circular and elongated with an aspect ratio of about 4. In use, air flows from left to right, defining a leading edge 90 and a trailing edge 91. Also defined is the chord length 92 and the chord width 93. At 90 and 91 there are small optical fibres providing external light sources.

The cross-section is filled at the leading edge with aramid 94 and the remainder filled with low density foam 95. The relative densities of the elements of the cross-section through the tether are such that the centre of mass is provided along line 96, and being symmetric close to the chord line.

As air flows from the leading edge to the trailing edge, the centre of aerodynamic pressure is located on line 97. As the centre of mass 96 and the centre of tension are nearer the leading edge 90 than is the centre of aerodynamic pressure 97, the arrangement shown is stable with an appropriate centre of shear and modest torsional forces. Thus the tether exposes its minimum area to the flowing air and experiences a minimised wind drag.

FIG. 11 shows an apparatus 100 according to the invention comprising a balloon or dirigible 102 connected to a base station (not shown) by a tether 106. The tether comprises an optical fibre cable 108 travelling from an intermittent light source 104 to the balloon or dirigible 102.

Spaced along the optical fibre 108 is a plurality of lights 110, 112 with lights 114 around the balloon or dirigible 102. As shown in more detail, the optical fibre cable 108 enters a coupler 116 which diverts a fraction of the light in the optical fibre to lights 110 and 112. The majority of the light remains in the optical fibre and travels to the next pair of lights, where the same process is carried out. At the balloon or dirigible 102 the remaining light is diverted equally to the lights 114.

Thus, safety lights are provided in a lightweight, compact and low wind resistance form.

FIG. 12 shows in detail the operation of a coupler 116 to provide light emission. Light from the optical cable 108 enters the coupler 116, whereupon a fraction of light 108a is diverted and directed to grating 118. The majority of the light passes through the coupler 116 and is not diverted. The diverted light exits the grating 118 and is directed onto reflective cone 120 which reflects the light in a wide angle to provide the light emission means. Other methods of distributing the diverted light to provide the light emission means can be readily conceived of

EXAMPLE

Effect of Tether Shape and Lifting Aerofoils on Balloon Size

The impact of the novel aerodynamic tether and lifting possibilities introduced by 'glider' arrangements or fins mounted on the tether can best be illustrated by the following comparisons. In the table below are six cases: the first three cases are compared after a multidimensional optimisation for a 1 kilometre elevation tethered system designed to withstand a 45 m/s, 87 knot sideways wind. Among other variables, this optimisation was within the constraints of a given material design stress, ensuring the tethers are self-aligning, platform power availability (10 kW), tether manufacturing feasibility and aerostat design. The comparison shows that a suitably designed aerodynamic tether reduces the aerostat volume by a factor of four, compared with a circular tether. The use of glider lifting technology, as well as an aerodynamic tether reduces the aerostat volume by a further factor of two over an aerodynamic tether alone. The aerostat lift is still sufficient to keep tether and gliders airborne and the platform at the desired elevation if sideways winds are negligible in the glider design case.

The modest tether tensions in the third case and the much smaller aerostat size lend themselves to mobile operation with transport by helicopter as described in FIG. 8 or land vehicle.

It can be seen that even greater advantages accrue with very high altitude platforms in the last three cases shown in the table. At high altitudes, balloon technology is more advanced than aerostat technology, and at 20 km altitude the wind forces on the balloon are relatively small compared with those of the tether. Furthermore with the glider technology one of the issues affecting tethered balloons, namely their ability to 'hunt' across the wind can be mitigated by suitable control strategies. The effect of glider and aerodynamic tether technologies combined can be seen to reduce the necessary balloon size from a presently unachievable 260 m diameter to a much more modest 58 metres in diameter, around a hundred fold reduction in balloon volume. However balloons even of 80 metres diameter, though not tethered, are regularly launched to altitudes of 30 km.

TABLE 1

| | High Altitude Platform: 1 km elevation, 45 m/s wind, 10 kw platform power, 50 kg payload | | |
|---|---|---|---|
| | Kevlar tension member | | |
| | Conventional Circular Tether | Aerodynamic Tether | Aerodynamic Tether with Glider Lift |
| Aerostat Dimensions Length × Diameter (m) | 42 × 16 | 24 × 9.1 | 19 × 7.3 |
| Aerostat Volume (m³) | 3200 | 800 | 400 |
| Tether Dimensions | 12 mm circular | 6 mm × 30 mm aerofoil | 5 mm × 25 mm aerofoil |
| Tension in tether at base | 4300 kg | 600 kg | 350 kg |

TABLE 1-continued

Very High Altitude Platform: 20 km altitude,
45 m/s wind at 20 km, 120 m/s at 10 km. 100 kw
power availability, 2000 kg payload PBO Tension member

|  | Circular Tether | Circular Tether with Glider Lift | Aerodynamic Tether with Glider Lift |
|---|---|---|---|
| Balloon diameter (m) | 260 | 95 | 58 |
| Balloon volume (m3) | 9,500,000 | 440,000 | 100,000 |
| Tether Dimensions | 110 mm diameter | 30 mm diameter | 16 mm × 80 mm aerofoil |
| Tension in tether base | 380 Tonnes | 85 Tonnes | 19 Tonnes |

The invention claimed is:

1. An apparatus for generating electrical energy at altitude, comprising a tether connecting a substantially ground-level location to a platform at an elevated location, the tether comprising a conduit coupled to an electrical generator at the platform, the conduit arranged to allow the flow of a fuel fluid from the substantially ground-level location to the elevated location, and the electrical generator being operable to convert energy in the fuel fluid to electrical energy at the elevated location, wherein the elevated location is at an altitude of from 5,000 m to 30,000 m.

2. An apparatus according to claim 1, wherein the elevated location is at an altitude of from 10,000 m to 25,000 m.

3. An apparatus according to claim 1, which comprises one or more balloons or dirigibles at the elevated location.

4. An apparatus according to claim 3, wherein such a one or more balloons or dirigibles is capable of providing a lifting force of at least 5.0 metric tonnes.

5. An apparatus according to claim 1, wherein the conduit is a pipe with an internal circular or near-circular cross-section, through which the fuel fluid flows.

6. An apparatus according to claim 5, wherein the inside diameter, through which the fuel fluid flows, is from 1.5 to 30 mm.

7. An apparatus according to claim 1, wherein the conduit contains fuel fluid at a flow rate of from 0.00002 to less than 1.0 kg/s.

8. An apparatus according to claim 1, wherein the fuel fluid comprises hydrogen or a hydrocarbon fluid.

9. An apparatus according to claim 8, wherein the fuel fluid is a hydrocarbon fluid having an average molecular weight of less than 200.

10. An apparatus according to claim 1, which comprises a fuel fluid pressurizer, operable to raise the pressure of the fuel fluid at the ground-level location in excess of 100 MPa.

11. An apparatus according to claim 1, wherein the fuel fluid comprises hydrogen and comprises a fuel fluid pressurizer, operable to raise the pressure of the fuel fluid at the ground-level location to a pressure of 0.2 to less than 100 MPa.

12. An apparatus according to claim 1, wherein the generator comprises a combustion engine, generating electricity by combustion of the fuel fluid.

13. An apparatus according to claim 1, wherein the generator comprises a fuel cell.

14. An apparatus according to claim 1, wherein the generator can produce from 0.5 to 20,000 kW of electrical power.

15. An apparatus according to claim 1, wherein the tether has a circular or non-circular cross-section and comprises a series of aerofoils at intervals along its length to provide lift to the tether from horizontal winds.

16. An apparatus according to claim 15, wherein the tether has a cross-section with an aspect ratio of from 1.5 to 20.0.

17. An apparatus according to claim 15, which, when air flows past the tether from a leading edge to a trailing edge, has a cross-section with its centre of mass nearer to the leading edge than is the centre of aerodynamic pressure.

18. An apparatus according to claim 15, which, when air flows past the tether from a leading edge to a trailing edge, the tether has a cross-section with its centre of mass less than 25% of a chord length from the leading edge.

19. An apparatus according to claim 1, wherein the platform comprises a gyroscopic stabiliser.

20. An apparatus according to claim 1, wherein the platform is contained within a shroud and the platform is suspended by the tether but is free to rotate about all axes with respect to the tether.

* * * * *